(12) United States Patent
Buer et al.

(10) Patent No.: US 8,520,722 B2
(45) Date of Patent: Aug. 27, 2013

(54) IF INTERFACE

(75) Inventors: Kenneth V. Buer, Gilbert, AZ (US); Michael Noji, Gilbert, AZ (US)

(73) Assignee: ViaSat, Inc., Carlsbad, CA (US)

( * ) Notice: Subject to any disclaimer, the term of this patent is extended or adjusted under 35 U.S.C. 154(b) by 1549 days.

(21) Appl. No.: 11/876,501

(22) Filed: Oct. 22, 2007

(65) Prior Publication Data

US 2009/0103596 A1 Apr. 23, 2009

(51) Int. Cl.
*H04B 1/38* (2006.01)
*H04L 5/16* (2006.01)

(52) U.S. Cl.
USPC .............................. 375/219; 455/502

(58) Field of Classification Search
USPC .................. 375/222, 224, 219; 455/502
See application file for complete search history.

(56) References Cited

U.S. PATENT DOCUMENTS

| | | | | |
|---|---|---|---|---|
| 5,138,634 A * | 8/1992 | Knapp | | 375/354 |
| 5,357,232 A * | 10/1994 | Suzuki et al. | | 335/215 |
| 5,987,060 A * | 11/1999 | Grenon et al. | | 375/213 |
| 6,396,844 B1 * | 5/2002 | Mack et al. | | 370/420 |
| 6,999,584 B1 | 2/2006 | Bogard | | |
| 7,050,765 B2 | 5/2006 | Ammar et al. | | |
| 7,558,553 B1 | 7/2009 | Raissinia et al. | | |
| 2002/0065052 A1 | 5/2002 | Pande et al. | | |
| 2003/0055590 A1 * | 3/2003 | Park et al. | | 702/107 |
| 2003/0152140 A1 * | 8/2003 | Antoniak | | 375/219 |
| 2004/0203337 A1 | 10/2004 | Ammar | | |
| 2004/0229562 A1 * | 11/2004 | Wren et al. | | 455/3.02 |
| 2007/0237242 A1 * | 10/2007 | Gjertsen | | 375/242 |
| 2008/0198791 A1 * | 8/2008 | Lloyd et al. | | 370/316 |

OTHER PUBLICATIONS

Extended European Search Report dated Jul. 14, 2011 in European Application No. 11154724.6.
Office Action dated Nov. 21, 2011 in U.S. Appl. No. 12/729,463.
Notice of Allowance dated Feb. 29, 2012 in U.S. Appl. No. 12/729,463.

* cited by examiner

*Primary Examiner* — Chieh M Fan
*Assistant Examiner* — Freshteh N Aghdam
(74) *Attorney, Agent, or Firm* — Snell & Wilmer L.L.P.

(57) ABSTRACT

Systems, devices, and methods may be provided for communicating telemetry signals between a satellite modem and transceiver over an IF receive link. In an exemplary embodiment, a communication system comprises a modem, a transceiver, an IF receive communication link coupling the modem and the transceiver and configured to allow IF communication between the modem and the transceiver, and a transceiver interface module and a modem interface module, wherein the modules are configured to allow telemetry communication between the modem and the transceiver over the IF receive communication link.

13 Claims, 4 Drawing Sheets

IF INTERFACE

FIELD

The subject of this disclosure may relate generally to systems, devices, and methods for an intermediate frequency (IF) interface in satellite communication systems, and more particularly to an IF interface for communication between a satellite modem and a satellite transceiver over existing cabling.

BACKGROUND

Communication systems, such as satellite communication systems, typically include a modem (also often called an indoor unit "IDU") which communicates with a transceiver (also known as an outdoor unit "ODU") over a cable. Generally, the modem receives signals from a computer and transmits those signals to the ODU over a transmit cable. The ODU sends and receives signals to and from a satellite. The ODU communicates signals received from the satellite to the IDU over a receive cable. The IDU is further configured to control the ODU. For example, the IDU may be configured to control the level of the RF (radio frequency) signal to be transmitted to a satellite.

Collectively, the IDU, ODU, and cable are generally termed "ground station". The ground station may be located on, for example, a stationary structure (e.g., building) or a moving structure (e.g., vehicle) such that communication with the satellite is permissible. In many applications, the IDU is located near or within a computer, e.g., a card that fits inside the computer processor or a box in proximity to the computer. One or more cables interconnect the IDU with the ODU. The ODU may be located outside, e.g., on the roof of a building or a vehicle. Another ground station, provides similar functionality for the opposite end of the communication link in order to connect the ground station to a telecommunications or computer network.

Typically, the signals communicated between the modem and the transceiver are communicated as intermediate frequency (IF) signals. In addition to IF signals, the cable or cables between the IDU and ODU often convey power and control signals from the IDU to the ODU.

Moreover, the cable or cables may be configured to provide telemetry functionality, i.e., remote measurement and reporting of information of interest. Various methods of providing telemetry have been used to convey information from the ODU to the IDU. However, these methods typically involve adding separate cables to carry the telemetry information, or involve complicated and relatively expensive modulator/demodulator technology. Thus, it is desirable to have improved methods of communicating telemetry type information, and the like, between the ODU and IDU.

SUMMARY

In exemplary embodiments, systems, devices, and methods for providing a telemetry interface between a modem and transceiver are described. The interface is configured to facilitate telemetry signal communication of information from the transceiver to a modem (and/or vice versa) via an existing communication link.

In an exemplary embodiment, a communication system is provided comprising a modem, a transceiver, an IF receive communication link coupling the modem and the transceiver and configured to allow IF communication between the modem and the transceiver, and a transceiver interface module and a modem interface module. The transceiver interface module and the modem interface modules are configured to allow telemetry communication between the modem and the transceiver over the IF receive communication link.

In accordance with another exemplary embodiment, the interface may be configured to facilitate telemetry communication without the use of a relatively expensive modulator/demodulator system. In another exemplary embodiment, the interface module may include the capability to detect errors and/or problems with the communications link.

Exemplary embodiments may include systems and methods for providing additional features for satellite communication transceivers. In other embodiments, a relatively low cost bidirectional digital interface between a satellite transceiver and modem is provided. In an exemplary embodiment the interface may be capable of operating on existing cabling systems.

BRIEF DESCRIPTION OF THE DRAWINGS

These and other features, aspects and advantages of the present invention will become better understood with reference to the following description, appending claims, and accompanying drawings where:

DETAILED DESCRIPTION

In accordance with an exemplary embodiment of the present invention, systems, devices, and methods are provided, for among other things, an interface for telemetry signal communication to and from the satellite transceiver and modem via an existing communication link. The following descriptions are not intended as a limitation on the use or applicability of the invention, but instead, are provided merely to enable a full and complete description of exemplary embodiments.

In accordance with an exemplary embodiment of the present invention, a satellite communication system may operate by utilizing a well defined digital interface standard, may not require additional modulation/demodulation hardware, and/or may not create unwanted spurious signals/interference. In accordance with another exemplary embodiment, the satellite communication system may be configured to provide telemetry through the IF receive cable. This may, for example, prevent having to install an additional power supply, and extra cabling.

Exemplary embodiments of the system described herein may also be backward compatible with existing systems, because telemetry signals may, for example, be ignored when transmitting and receiving IF signals, or during an installation that does not use the telemetry signals. In other words, an IDU that has its half of the telemetry circuit described herein will still work with an older transceiver that may not have its half of the telemetry circuit described herein, and vice versa. This is because a transceiver that has the telemetry circuit will just transmit regardless of whether an older modem is used that is not looking for the telemetry signal transmitted. This will not interfere with normal operations of the IDU/ODU. The same is true in the case of a modem that has the functionality described herein, but a transceiver without this functionality. Thus, the system could be upgraded over time to achieve the full compatibility and functionality described herein.

Figure 1:
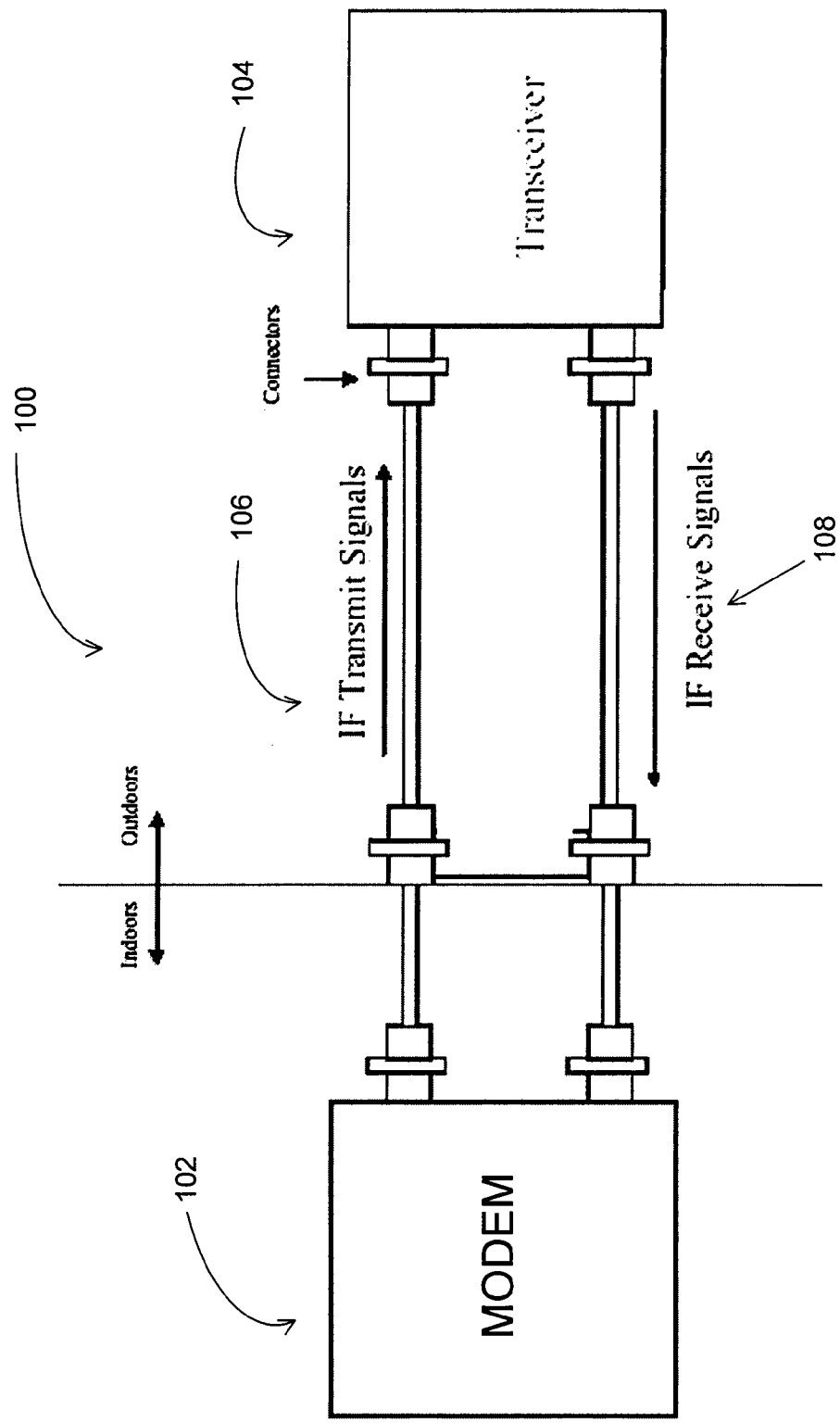
FIG. 1 illustrates a portion of a prior art satellite communication system.

FIG. 1 is a block diagram of a prior art satellite communication system 100. System 100 includes a modem 102, a transceiver 104, as well as a transmit link 106 and a receive link 108. With this system, transceiver 104 communicates via IF signals with modem 102 to facilitate satellite communication, such as satellite based internet service, among others. Transmit and receive links may comprise coaxial cable. Transmit link 106 may facilitate communicating intermediate frequency transmission signals from modem 102 to transceiver 104. Similarly, receive link 108 may facilitate communicating intermediate frequency receive signals from transceiver 104 to modem 102. Modem 102 is often referred to as an indoor unit (IDU) and transceiver 104 is often referred to as an outdoor unit (ODU), and this nomenclature is used in this description. Nevertheless, the modem and the transceiver may be physically located anywhere (be it indoor, outdoor, or otherwise), and the definition of modem or transceiver shall not be limited by their physical location.

One possible telemetry methodology includes sending the telemetry over the transmit link 106. Such a telemetry system may involve the use of a complex modulate/demodulate system. One telemetry protocol for Ku Band Low Noise Block converters (LNBs) may be digital satellite equipment control (DiSeQC), which may utilize a 22 KHz carrier for bidirectional modulation/demodulation communication on an existing IF transmit communication link. Unfortunately, this type of system does not have an official standard for transmit systems, and involves relatively expensive additional hardware both in the transceiver and modem to modulate/demodulate the data signal. Another drawback may include that the 22 KHz signal may be very difficult and expensive to filter well enough for transmit systems, due to the much tighter spurious requirements and the higher DC power involved. Further drawbacks may include increased electro-magnetic interference (EMI) from a modulating/demodulating system. Thus, a modulate/demodulate telemetry system may have significant disadvantages.

Figure 2:
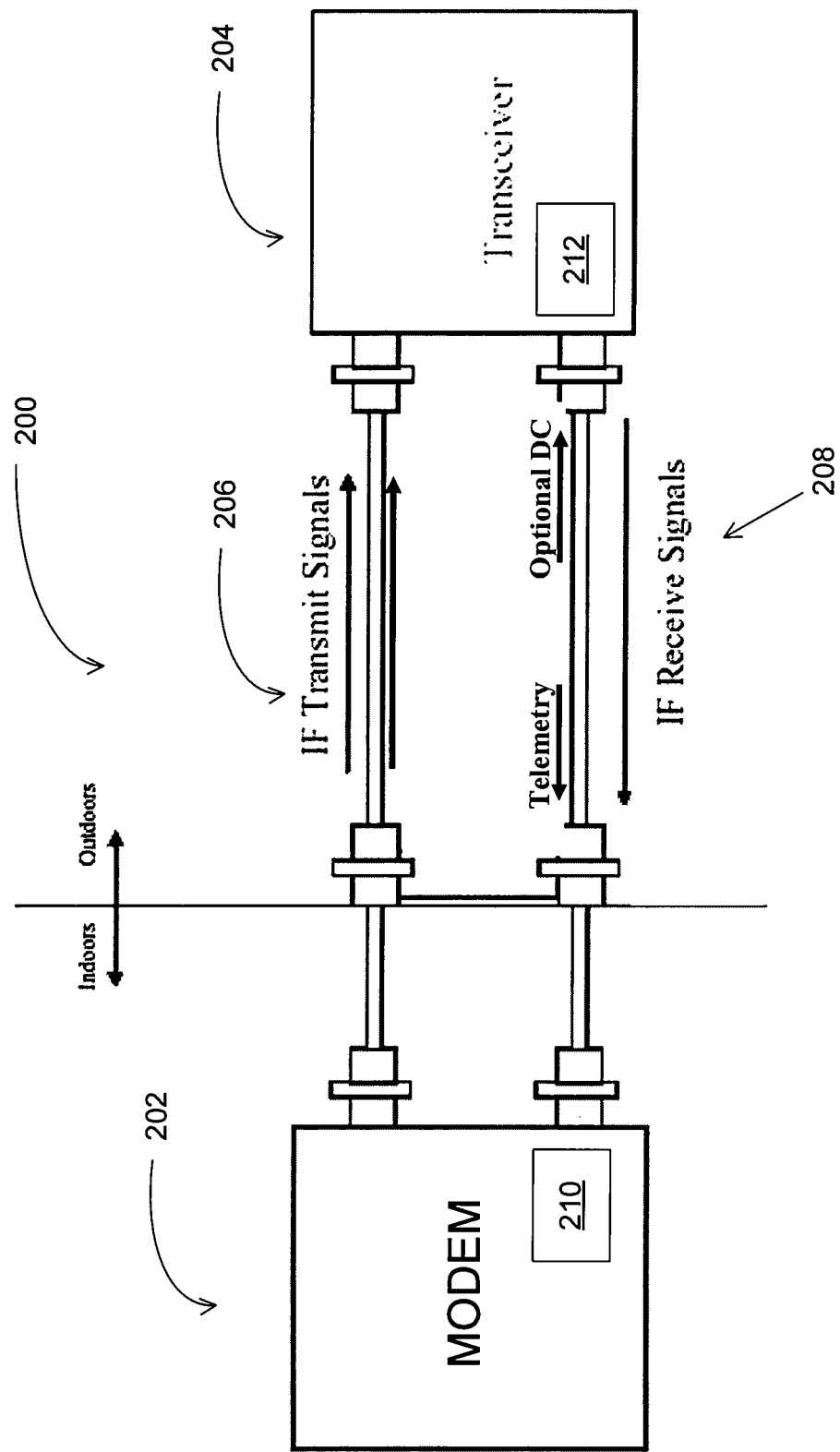
FIG. 2 illustrates a satellite communication system, according to an exemplary embodiment.

In accordance with an exemplary embodiment of the present invention, and with reference to FIG. 2, a satellite communication system is configured to facilitate communication of telemetry signals/information between the transceiver and the modem over the IF receive link. In accordance with one exemplary embodiment, a satellite communication system 200 includes a modem 202, a transceiver 204, a transmit link 206, and a receive link 208. Transmit link 206 is connected between modem 202 and transceiver 204. Similarly, receive link 208 is connected between modem 202 and transceiver 204.

Modem 202, for example, may be a ViaSat Surfbeam DOCSIS modem. In another example, modem 202 is a satellite modem. Modem 202 may be configured to facilitate communication between transceiver 204 and a computer system (not shown). In an exemplary embodiment, the communication between modem 202 and transceiver 204 may be in the form of IF communication signals. Thus, modem 202 may comprise any device configured to communicate IF signals with a transceiver 204.

In an exemplary embodiment modem 202 may further include an interface module 210. Interface module 210 may comprise circuitry, which facilitates telemetry communication between modem 202 and transceiver 204 via IF receive link 208. Interface module 210 may be inside modem 202 or outside modem 202. For example, in one embodiment, system 200 is configured with receive link 208 connected to interface module 210, which is connected to the receive link input of modem 202.

In various exemplary embodiments, interface module 210 is one of: embedded in the circuitry of modem 202, a separate circuit inside modem 202, and a separate circuit used outside of modem 202. Thus, interface 210 may be configured to be added to a typical modem to achieve the telemetry functionality described herein.

Transceiver 204, for example, may be similar to a US Monolithics Ka Band transceiver, Model No. USM-TXR-KA01-F-01-110. In another example, transceiver 204 may be a satellite transceiver, e.g., a Ka-band satellite transceiver, or any other suitable frequency. In an exemplary embodiment, transceiver 204 may be any transceiver configured to provide communication between modem 202 and a satellite (not shown). Thus, transceiver 204 may be any suitable transceiver device.

In an exemplary embodiment, transceiver 204 further includes an interface module 212. Interface module 212 may comprise circuitry, which facilitates telemetry signal communication between modem 202 and transceiver 204 via IF receive link 208. Interface module 212 may be inside transceiver 204 or outside transceiver 204. For example, in on embodiment, system 200 is configured with receive link 208 connected to interface module 212, which is connected to the receive link output of transceiver 204. Similar to interface module 210, interface module 212 may be one of: embedded in the transceiver circuitry, a separate circuit in transceiver 204, and a separate circuit outside of transceiver 204.

Thus, in accordance with an exemplary embodiment, interface module 210 and/or interface module 212 are configured to send and/or receive digital communication signals via link 208, such that transceiver 204 and modem 202 may communicate telemetry information. The telemetry information may include, but is not limited to the following types of information: information identifying the presence and/or cause of errors in the satellite communication system; command signals causing the transceiver to power off and power back on, i.e., re-boot; information identifying components in the ODU, performance information facilitating conveying the performance of the transceiver and/or the communication links; serial number; transmitted output RF power level; transceiver faults; ODU operating voltages and temperature; and/or the like.

Although described herein primarily in terms of a transceiver sending telemetry signals to a modem, in other exemplary embodiments, the transceiver and modem are configured so that telemetry signals can be sent from the modem to the transceiver and/or can be sent in both directions. For example, in the two way telemetry exemplary embodiment, the modem (and the transceiver) may comprise both a device for sensing telemetry signals and a device for sending telemetry signals over receive link 208.

For example, interface module 210 and/or interface module 212 may be configured to monitor the communication links 206 and 208, for errors. Discovered error conditions may be reported back to modem 202 via telemetry. These error conditions may be reported to remote locations. In this exemplary way, the system may be troubleshot remotely. Furthermore, interface module 210 and/or interface module 212 may be configured to indicate errors when a technician comes to the installation site to troubleshoot the system. Thus, an error message may be displayed to indicate a possible source of the error and/or the system not working.

Furthermore, in another example embodiment, interface module 210 and/or interface module 212 are configured to cycle power to the transceiver, via DC signal over IF receive link 208. This may allow resetting of the system in certain instances, which may eliminate errors that may have occurred in the system. In this manner, the system may clear errors, which may occur from time to time, without a technician coming to fix the system, or someone remotely troubleshooting the system.

During installation of a ground system, the person installing the system will often physically write down hardware information, including the transceiver serial number, for troubleshooting and warranty information purposes. This information is then manually entered into a computer system. Thus, this manual method has an undesirable likelihood of errors being made in the identification of and operation of installed hardware. Even if the identification information is correctly entered, the system configuration and/or components may change with changes in programming, environment, parts, and/or the like. For example, the transceiver may be replaced. Therefore, a manual process may result in incorrect information about the ODU.

In accordance with another example embodiment of the present invention, modem 202 may be configured to provide power, via link 208, to a standard satellite signal strength meter. This meter may be connected between link 208 and the input to transceiver 204. This type of meter is widely used when a satellite receiver is installed. Thus, interface 210 may be configured to provide power to installation devices and other temporary devices. For example, interface 210 may be configured to power an installation tool that assists with aligning the antenna (e.g., for a Ka Band system, or other frequency systems).

In an exemplary embodiment, the interface may include a DC path to the power conversion circuitry to allow power applied from the receiver IF cable to turn on the receiver section during installation. In an exemplary embodiment, during the installation process, the microprocessor will detect a constant logic high, and then can inhibit the transmit section for the modem to prevent excessive power draw from the hand-held meter, and to protect the person installing the component(s) from the transmit EM radiation.

Interface 210, 212 may be configured to utilize an asynchronous serial digital protocol multiplexed onto the receive IF communication link. A relatively low cost microcontroller may be utilized to provide the serial interface protocols. In other exemplary embodiments, interfaces 210, 212 are configured to utilize other communication methods, for example, asynchronous methods such as Universal Asynchronous Rx and Tx ("UART"), Controller Area Network ("CAN"), and/or the like, and synchronous methods such as Universal Synchronous Rx and Tx ("USRT"), Serial Peripheral Interface ("SPI"), I2C, and/or the like.

Although described herein as a transceiver, in one exemplary embodiment, the transceiver described herein may instead be replaced with a transmitter and a separate receiver, or replaced with just a receiver. In this exemplary embodiment, interface module 212 may be associated with the receiver; e.g., located within the receiver, integrated with the receiver, or a separate component associated with the receiver. Interface module 212 functions in this embodiment similar to as described with respect to the embodiment having a transceiver.

In an exemplary embodiment, transmit link 206 and receive link 208 may comprise coaxial cable. However, other communication media/links are intended to be encompassed within the scope of this disclosure. For example, links 206 and 208 may comprise twisted-shielded pairs or any other interconnect that can support IF frequencies. In an exemplary embodiment, link 208 may be configured to carry telemetry signals between modem 202 and transceiver 204. In another exemplary embodiment, link 208 may be configured to provide a DC signal to transceiver 204 from modem 202. Of course, link 208 may also be configured to communicate IF signals from transceiver 204 to modem 202. In various embodiments, the telemetry signal and/or a DC signal may be in addition to, and not interfere with IF signals transmitted and received by the system.

In an exemplary embodiment, the telemetry signal may include information such as the transceiver serial number, resistance of the links 206, 208, IP address, output power, temperature, hardware and/or software information, and/or factory install information for the various components. It will be appreciated that other information may be included within telemetry signal 220. The resistance of links 206, 208 may be useful for determining if a cable is too long, the wrong grade cable, cut, damaged, etc.

The information may be unrelated to the IF signals being transferred to and from the satellite, and to and from any device connected to modem 202. With this configuration, information about the specific hardware of the transceiver 204, and/or links 206 and 208 may be relayed to modem 202. This information may then be used locally or remotely to trouble shoot the ground unit. Moreover, such telemetry enables remote access to such information for preventative maintenance. For example, such telemetry enables a supplier of ground stations to use a web crawler or other communications method to check up on its components and to follow up with the owners when the telemetry data indicates that repairs or maintenance may be appropriate.

With this configuration, a transceiver serial number may be transmitted to the modem during set up of the system, such that an operator may not have to write down the specific information. The telemetry data could be passed from the modem to a central facility for warranty processing, initialization of a customer account, quality control on the products and installation, and/or the like. Other information may include calibration and/or setup information. Furthermore, this may allow troubleshooting of the system via the satellite link from transceiver 204 to a satellite (not shown).

In an exemplary embodiment, modem interface module 210 and/or transceiver interface module 212 are configured to be powered from existing power sources within the system. In other exemplary embodiments, however, the interface modules may be powered by other sources of power.

Figure 3:
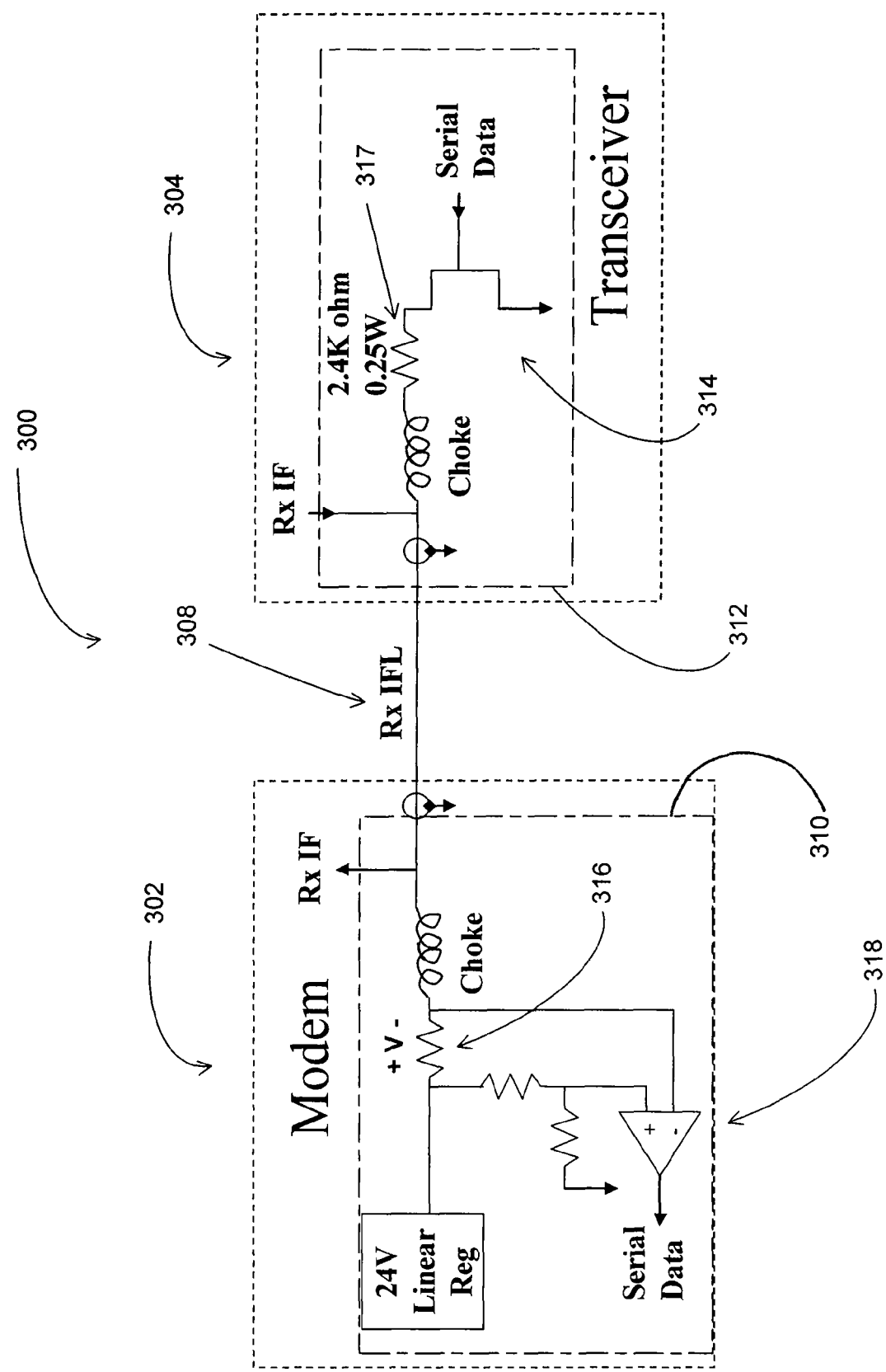
FIG. 3 illustrates a satellite communication system, according to another exemplary embodiment.

In accordance with an exemplary embodiment of the present invention, and with reference to FIG. 3, a satellite communication system 300 may include a modem 302, a transceiver 304, and an IF receive communication link 308.

In an exemplary embodiment, modem 302 includes modem interface 310. Similarly, transceiver 304 includes transceiver interface 312. In an exemplary embodiment, both modem interface 310 and transceiver interface 312 include circuitry configured to communicate between modem 302 and transceiver 304. Although various circuits may be designed to facilitate communication between modem 302 and transceiver 304, one example of such circuitry is provided here. Nevertheless, interface 310, 312 may comprise any circuitry that facilitates digital, non-multiplexed, communication between modem 302 and transceiver 304 over IF receive link 308. Other circuitry may also be configured in other exemplary embodiments to facilitate analog communication between modem 302 and transceiver 304 over IF receive link 308.

In an exemplary embodiment, transceiver interface 312 includes switch 314. When activated, switch 314 will cause current to flow, which will cause the voltage V across resistor 316, within modem interface 310, to change. This change in voltage may be detected via comparator 318. This controlled change in voltage allows digital communication between modem 302 and transceiver 304.

In an exemplary embodiment, the transceiver interface 312 contains a switch 314 (implemented as a bipolar or FET transistor) that turns on and off (corresponding to logic high & low logic states). When the transistor 314 is off there is no current draw on the 24 VDC, and when the transistor 314 is 'on' there may be ~10 mA of current draw, which causes a voltage to develop across the sensing resistor 316 in the modem interface 310. This voltage may be detected via a comparator or saturated amplifier 318. Thus, this is one example method for communicating digital data from transceiver 204 to modem 202. Because of the small amount of current draw, the power dissipation is limited to a reasonable (0.25 W in this embodiment) amount in both the sense resistor 316 in the modem interface 310 and the load resistor 317 in the transceiver interface 312.

The embodiment depicted in FIG. 3 is but one of many configurations, which may allow communication between modem 302 and transceiver 304. Any other suitable configuration is also intended to be encompassed by this disclosure. In an exemplary embodiment, the circuit may be any device or configuration of components that is used to pulse or change the current draw through the inter-facility link (e.g., link 208) for the purpose of communicating to the IDU. For example, a switch, current source, transistor or logic device.

In an exemplary embodiment, the circuitry of modem interface 302 and transceiver interface 304 are configured to transmit serial digital data between themselves via IF receive link 308. In this embodiment, the interface circuitry is shown as included within modem 302 and transceiver 304. It will be appreciated that the interface circuitry may be separate from the modem 302 and transceiver 304. For example, the IF receive link output of transceiver 304 may be connected to transceiver interface 312 which may be connected to IF receive link 308, which may be connected to modem interface 310, which may in turn be connected to the IF receive link input of modem 302.

In an exemplary embodiment, the interface circuitry may be used for sending telemetry signals, which may include factory stored data such as serial number and/or performance data, and/or status queries for monitoring the transceiver temperature and voltages, among other information. Therefore, in an exemplary embodiment, the interface circuitry 310, 312 is configured to measure voltage and current differences in transmit and receive mode. In another example, the interface is configured to calculate and report cable resistance using the serial interface.

The telemetry signals, such as those described herein may be sensed, measured, calculated, or otherwise determined by transceiver interface 312 or by independent devices (that are known in the art) within transceiver 304 or external to transceiver 304. Either way, this information is communicated to transceiver interface 312 and is then communicated over link 308 to modem 302.

In an exemplary embodiment, the modem interface 310 and/or the transceiver interface 312 includes an inductor labeled Choke in FIG. 3. Choke may be included to insure IF sent over IF receive link 308 from transmitter 304 to modem 302 do not pass the chokes and interfere with the circuitry of modem interface 310 and transceiver interface 312. Thus, link 308 may communicate IF signals and DC telemetry signals, and/or power simultaneously.

In the prior art, a 24 VDC power supply may provide up to 150 mA during the installation process (to supply power to the antenna pointing tool). The presence of 24 VDC may preclude the use of a standard base-band digital interface. Furthermore, superposition may also not be feasible to be utilized because of the low power supply impedance used to source and regulate up to 150 mA. In contrast, exemplary embodiments described herein may be less complicated, lower cost, and/or may cause less EMI problems than prior art solutions.

In one exemplary embodiment, the interfaces are separate parts of the modem/transceiver circuitry. In another exemplary embodiment, the interface circuitry may be included on the same chip and/or board as the modem and/or transceiver. Because exemplary embodiments utilize the existing receive IF communication link, upgraded systems may begin sending telemetry signals shortly after installation and/or upgrade.

Figure 4:
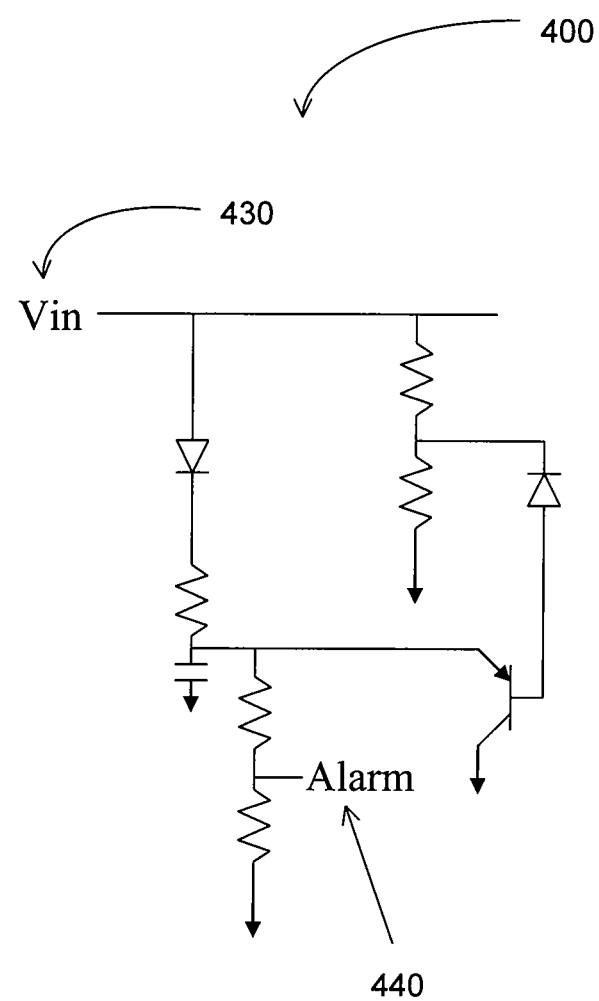
FIG. 4 illustrates a detection circuit, according to an exemplary embodiment.

FIG. 4 illustrates an exemplary error detection circuit 400, according to an exemplary embodiment. Errors may be detected, for example, if the voltage is too high or too low (i.e., above or below a set point). Circuit 400 may sense voltage at 430 and may provide an alarm at 440 when an alarm condition is detected.

Alarm 440 may be configured to communicate the alarm to modem 302 via interface modules 310, 312. For example, alarm 440 may be connected directly or indirectly to switch 314.

In another exemplary embodiment, a circuit may be configured to detect the voltage in transmit mode and in receive mode and, using the difference, to calculate the resistance. If the calculated resistance is above a desired threshold, the circuit may be configured to send an alarm to modem 302 (e.g., through switch 314). It should be understood that although described herein as switch 314, any device or combination of electrical components may be used that is configured to generate a telemetry signal on receive link 308. Furthermore, any device or combination of electrical components may also be used on the modem side to detect the telemetry signal being communicated over receive link 308.

In general an alarm may indicate an error with the system and, more particularly an error with the communication link. In one embodiment, the communication link may be coaxial cable and the alarm condition would indicate that either the link has been severed, and/or another error exists in the link.

An error detection circuit such as circuit 400, or any other sensor or detection/calculation/reporting circuit/device may be included within the interface module circuitry. Alternatively, in another embodiment, these devices may be included in a separate module, at the transceiver, and/or other location. It will be appreciated that, although circuit 400 is one embodiment of an error detection circuit, many other configurations may be utilized without straying from the concepts disclosed herein.

Any of the devices described herein may directly communicate with switch 314. In another exemplary embodiment, such sensors, detectors, and the like may communicate with a microprocessor or other logic device—using a protocol such as those discussed herein—and toggle switch 314 on/off to create the current change and transmit the data. Thus, switch 314 may be connected to a microprocessor or other logic device configured to control the switching of switch 314.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. Furthermore, couple may mean that two objects are in communication with each other, and/or communicate with each other, such as two pieces of software, and/or hardware, or combinations thereof.

Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

It should be appreciated that the particular implementations shown and described herein are illustrative of various embodiments including its best mode, and are not intended to limit the scope of the present disclosure in any way. For the sake of brevity, conventional techniques for signal processing, data transmission, signaling, and network control, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system.

While the principles of the disclosure have been shown in embodiments, many modifications of structure, arrangements, proportions, the elements, materials and components, may be used in practice, which are particularly adapted for a specific environment and operating requirements without departing from the principles and scope of this disclosure. These and other changes or modifications are intended to be included within the scope of the present disclosure and may be expressed in the following claims.

The invention claimed is:

1. A method of adding two way telemetry communication between a modem and a transceiver in a satellite communication system, where the modem and transceiver are connected via a single IF receive link, where such two way telemetry communication does not initially exist, the method comprising the steps of:
upgrading the transceiver such that the transceiver is connected to the IF receive link via a transceiver interface; wherein the transceiver interface is configured to communicate telemetry information by adding a telemetry signal to the IF receive link as a non-multiplexed digital DC signal and extracting a command signal from the IF receive link; wherein the telemetry signal and the command signal do not interfere with an IF signal on the IF receive link; wherein the command signal is extracted by way of a first IF choke; and
upgrading the modem such that the modem is connected to the IF receive link via a modem interface; wherein the modem interface is configured to communicate the telemetry information by adding the command signal to the IF receive link as a non-multiplexed digital DC signal and extracting the telemetry signal from the IF receive link; wherein the telemetry signal is extracted by the way of a second IF choke.

2. The method of claim 1, wherein the modem interface is internal to the modem and wherein the transceiver interface is internal to the transceiver.

3. The method of claim 1, further comprising the step of connecting one or more detection modules to the transceiver interface for communicating information to the transceiver interface that is at least in part communicated as telemetry information to the modem.

4. The method of claim 3, wherein the detection module is capable of detecting errors with the communication link.

5. The method according to claim 3, wherein the detection module is capable of measuring a resistance of the communication link.

6. The method of claim 1, wherein the modem is a satellite modem, and wherein the transceiver is a Ka-band satellite transceiver.

7. The method of claim 1, further comprising converting the telemetry information to a digital signal prior to adding the telemetry information to the IF receive link.

8. A communication system, comprising:
a modem;
a transceiver;
a single IF receive communication link coupling the modem and the transceiver configured to allow IF communication between the modem and the transceiver; and
a transceiver interface module comprising a first IF choke and a modem interface module comprising a second IF choke, wherein the modules are configured to allow non-multiplexed two way telemetry communication between the modem and the transceiver over the IF receive communication link, wherein the non-multiplexed two way telemetry communication comprises a non-multiplexed digital DC telemetry communication signal and a non-multiplexed digital DC command signal that do not interfere with an IF signal on the IF receive communication link, wherein the first IF choke is capable of separating the digital DC command communication signal from the IF signal and the second IF choke is capable of separating the digital DC telemetry signal from the IF signal.

9. The communication system according to claim 8, wherein the modem is a satellite modem, and wherein the transceiver is a Ka-band satellite transceiver.

10. The communication system according to claim 8, wherein at least one of:
(A) said transceiver interface module comprises a circuit configured to add said telemetry signal to said IF receive communication link and said modem interface module comprises a circuit configured to detect said telemetry signal; and
(B) said modem interface module comprises a circuit configured to add said telemetry signal to said IF receive communication link and said transceiver interface module comprises a circuit configured to detect said telemetry signal.

11. The communication system according to claim 8, wherein the transceiver interface module and modem interface module together are configured to enable communication of telemetry signals over the IF receive link without the need to make any change to the IF receive link, where before the addition of the transceiver interface module and modem interface module, such communication of telemetry signals was not possible over the IF receive link.

12. A method of communicating two way telemetry information between a modem and a transceiver, the method comprising the steps of:
receiving, by a first interface circuit in the transceiver, non-multiplexed telemetry information associated with the transceiver;
converting, by the first interface circuit, the telemetry information into a telemetry digital DC signal;

adding, by the first interface circuit, the telemetry digital DC signal to a single IF receive link between the modem and the transceiver;

separating, by a choke included in the second interface circuit in the modem, the telemetry digital DC signal from an IF signal on the IF receive link;

receiving, by the second interface circuit, non-multiplexed command information associated with the modem;

converting, by the second interface circuit, the command information into a command digital DC signal;

adding, by the second interface circuit, the command digital DC signal to the IF receive link between the modem and the transceiver; and separating, by a choke included in the first interface circuit, the command digital DC signal from the IF signal on the IF receive link;

wherein the telemetry digital signal and the command digital signal do not interfere with the IF signal on the IF receive link.

13. A two way telemetry interface circuit system comprising:

a first interface circuit having a receive intermediate frequency (IF) link input configured for connection to a single receive IF link, a receive IF output connection configured for connection to a modem, and a telemetry output; wherein the first interface circuit is configured to:
  a. accept receive IF communications signals at the receive IF link input from a transceiver;
  b. add a non-multiplexed command digital DC signal based on command data to the receive IF link input to facilitate communication of the command digital DC signal to the transceiver and extract, by way of a first IF choke, a non-multiplexed telemetry digital DC signal from the receive IF communications signals, and provide the non-multiplexed digital DC signal to the telemetry output; and
  c. provide the receive IF communications signals to the receive IF output connection; and a second interface circuit having a receive IF link output configured for connection to the single receive IF link, a receive IF input connection configured for connection to the transceiver, and a telemetry input; wherein the second interface circuit is configured to:
  a. accept receive IF communications signals at the receive IF input connection from the transceiver;
  b. add the non-multiplexed telemetry digital DC signal to the receive IF communications signals and extract by, way of a second IF choke, the non-multiplexed command digital DC signal from the receive IF communications signals; and
  c. provide the receive IF communications signals to the receive IF link output;

wherein the non-multiplexed telemetry digital DC signal and the non-multiplexed command digital DC signal do not interfere with the receive IF communications signals on the IF receive link.

* * * * *

UNITED STATES PATENT AND TRADEMARK OFFICE
CERTIFICATE OF CORRECTION

PATENT NO. : 8,520,722 B2  Page 1 of 1
APPLICATION NO. : 11/876501
DATED : August 27, 2013
INVENTOR(S) : Kenneth V. Buer and Michael Noji It is certified that error appears in the above-identified patent and that said Letters Patent is hereby corrected as shown below:

In the Claims

In Column 12, line 7, Claim 13, "telemetry" after the word "non-multiplexed" is excluded in error and should be added.

In Column 12, line 15, Claim 13, the ";" after the word "to" is included in error and should be removed.

In Column 12, line 15, Claim 13, the ":" after the word "to" is excluded in error and should be added in the place of the ";" that was included in error.

Signed and Sealed this
Third Day of December, 2013

Margaret A. Focarino
*Commissioner for Patents of the United States Patent and Trademark Office*